United States Patent
Sakashita et al.

(10) Patent No.: US 10,983,882 B2
(45) Date of Patent: Apr. 20, 2021

(54) METHOD FOR LATENCY IMPROVEMENT OF STORAGES USING LOW COST HARDWARE

(71) Applicant: Hitachi, Ltd., Tokyo (JP)

(72) Inventors: Yuki Sakashita, Santa Clara, CA (US); Keisuke Hatasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 132 days.

(21) Appl. No.: 16/324,817

(22) PCT Filed: Jan. 25, 2017

(86) PCT No.: PCT/US2017/014993
§ 371 (c)(1),
(2) Date: Feb. 11, 2019

(87) PCT Pub. No.: WO2018/140016
PCT Pub. Date: Aug. 2, 2018

(65) Prior Publication Data
US 2019/0227889 A1    Jul. 25, 2019

(51) Int. Cl.
*G06F 11/20*    (2006.01)
*G06F 3/06*    (2006.01)

(52) U.S. Cl.
CPC .......... *G06F 11/2069* (2013.01); *G06F 3/061* (2013.01); *G06F 3/065* (2013.01); *G06F 3/067* (2013.01); *G06F 3/0611* (2013.01); *G06F 3/0635* (2013.01); *G06F 3/0665* (2013.01); *G06F 3/0679* (2013.01)

(58) Field of Classification Search
CPC ...... G06F 3/065; G06F 3/0631; G06F 3/0685; G06F 12/023
See application file for complete search history.

(56) References Cited

U.S. PATENT DOCUMENTS

| | | | |
|---|---|---|---|
| 8,943,286 B1 | 1/2015 | Watanabe et al. | |
| 9,569,139 B1 * | 2/2017 | Mendes | G06F 3/0631 |
| 10,353,634 B1 * | 7/2019 | Greenwood | G06F 3/0619 |
| 2005/0138011 A1 | 6/2005 | Royer et al. | |
| 2009/0089343 A1 | 4/2009 | Moore et al. | |
| 2016/0196163 A1 | 7/2016 | van Gulik et al. | |

* cited by examiner

*Primary Examiner* — Michelle T Bechtold
(74) *Attorney, Agent, or Firm* — Procopio, Cory, Hargreaves & Savitch LLP

(57) ABSTRACT

Example implementations described herein are directed to systems and methods involving an application running on a host computer and configured to manage storage infrastructure. The application not only manages resources already allocated to itself, but also manages the allocation and de-allocation of resources to itself. The resources can be allocated and de-allocated based on the type of process being executed, wherein upon occurrence of a failure on a primary storage system, higher priority processes that are executed on connected failover storage system nodes are given priority while the lower priority processes of such failover storage system nodes are disabled.

15 Claims, 14 Drawing Sheets

201

| Node# | Number of Flash | Flash Size | | Number of Disk | Disk Size | | Memory Size | | Priority | CPU Load |
|---|---|---|---|---|---|---|---|---|---|---|
| | | Total [GB] | Free [GB] | | Total [GB] | Free [GB] | Total [GB] | Free [GB] | | |
| 0 | 12 | 9,600 | 7,000 | 0 | 0 | 0 | 256 | 128 | 99 | 70 |
| 1 | 8 | 6,400 | 2,400 | 4 | 12,000 | 12,000 | 128 | 32 | 1 | 30 |
| 2 | 0 | 0 | 0 | 12 | 48,000 | 10,000 | 128 | 32 | 0 | 10 |
| 3 | 0 | 0 | 0 | 12 | 72,000 | 36,000 | 256 | 64 | 2 | 60 |

| Volume # | Drive Type | Volume Group # | Node # | Volume Size Total [GB] | Volume Size Free [GB] |
|---|---|---|---|---|---|
| 1 | Flash | - | 0 | 6,400 | 4,800 |
| 2 | Flash | - | 1 | 3,200 | 2,000 |
| 3 | Disk | 0 | 1,2,3 | 9,600 | 6,000 |
| 4 | Disk | 0 | 1,2,3 | 12,000 | 10,000 |
| 5 | Disk | 0 | 1,2,3 | 12,000 | 8,000 |
| 6 | Disk | 0 | 1,2,3 | 8,000 | 4,000 |

| Page | Bit Map |
|---|---|
| 0-63 | 0000 0000 0000 0000 |
| 64-127 | FFFF FFFF FFFF FFFF |
| 128-191 | FFFF FFFF FFFF FF00 |
| 192-255 | 0000 FFFF FFFF 0000 |
| 256-319 | CCCC CCCC CCCC CCCC |
| --- | --- |
| n | 0000 0000 0000 0000 |

METHOD FOR LATENCY IMPROVEMENT OF STORAGES USING LOW COST HARDWARE

BACKGROUND

Field

The present disclosure is generally related to storage systems, and more specifically, for facilitating latency improvement for storage systems.

Related Art

To facilitate Online Transaction Processing (OLTP), the storage system facilitating the OLTP has a latency that is short enough for transaction processing system (TPS). Thus, such related art storage implementations involve flash in the form of an all flash array (AFA) due to the latency. Such AFA implementations tend to be expensive. Moreover, TPS implementations require the down time to be minimized, as well as minimal performance degradation during incidents of system failure. Therefore, related art TPS implementations can involve standby systems, which increases the hardware expense.

If the TPS implementation can copy replication data to volumes on analytics processing system (APS) instead of standby systems, the hardware cost of the standby systems can be reduced. Thus in related art implementations, APS can be utilized with TPS to analyze data stored in TPS. In such related art implementations, the OLTP can switch paths and access replication data from volumes on the APS during storage system failure.

In an example related art implementation, there is a storage system wherein a first volume from a first storage system and a second volume from a second storage system. The first volume and second volume are set as a high availability pair and associated with a virtual volume. Such a virtual volume can involve multiple volumes. In such a related art implementation, a path can be connected between a virtual volume and host computer instead of being between a real volume and host computer. Further, a path switch program selects a path to a volume to be accessed among the paths allocated to virtual volumes. An example of such a storage system is described, for example, in U.S. Pat. No. 8,943,286, herein incorporated by reference in its entirety for all purposes.

SUMMARY

In related art implementations, the access latency of the OLTP becomes worse when the OLTP accesses replication data from the APS. The APS may be configured with software defied storage (SDS) on commodity hardware with inexpensive disks because of scalability requirements of the APS for facilitating big data storage implementations.

In related art implementations, there can be drive differences between the TPS and the APS. APS implementations may involve disks which are inexpensive but have large latency and slow storage speeds for analytics processing such as for big data analytics. Flash devices can be used to meet the shorter latency requirements requirement for TPS implementations.

Thus, the access latency for OLTP may be delayed when the target of access is changed to volumes on APS from volumes from TPS, which can occur during the failure of the TPS. Example implementations are directed to addressing the possible access latency issues that may occur from the switchover.

In example implementations, a storage system selects volumes by considering the kind of disks and the memory size to allocate data to flash or memory as much as possible. Such implementations can reduce the frequency of access to disks during the failure of the storage system. Upon the occurrence of failure on the storage system, the SDS nodes without flash devices load data from disks to memory, and SDS nodes with flash devices are configured to end processes other than storage process.

Example implementations utilize an application that defines the storage infrastructure. Such implementations may be used by application programmers to develop applications quickly and flexibly, without having to communicate with storage administrators to make storage infrastructure changes.

Aspects of the present disclosure include a first storage system communicatively coupled to a second storage system configured to execute a second type of process and to manage a plurality of volumes, and a host configured to execute a first type of process. The first storage system can involve a memory configured to manage management information involving free space information for each volume of the plurality of volumes of the second storage system, drive type information for each volume of the plurality of volumes of the second storage system, and free space information for flash devices of the second storage system; and a processor configured to, for receipt of a write command for data from the host, determine if the data is to be written to the first storage system or the second storage system. For the data determined to be written to the second storage system, the processor is configured to select a volume from the plurality of volumes for the write command based on the free space information for each volume, the drive type information for each volume, and the free space information for flash devices of the second storage system. For the free space information for the selected volume indicating free space exceeding a write size associated with the write command, the drive type information for the selected volume being flash, and the free space information for the flash devices indicating free space exceeding the write size associated with the write command, the processor is configured to update the free space information for the flash drives based on the write size associated with the write command; and execute the write command on the flash devices of the second storage system.

Aspects of the present disclosure further include a method for a first storage system communicatively coupled to a second storage system configured to execute a second type of process and to manage a plurality of volumes, and a host configured to execute a first type of process. The method can involve managing management information including free space information for each volume of the plurality of volumes of the second storage system, drive type information for each volume of the plurality of volumes of the second storage system, and free space information for flash devices of the second storage system; and, for receipt of a write command for data from the host, determining if the data is to be written to the first storage system or the second storage system. For the data determined to be written to the second storage system, the method can further include selecting a volume from the plurality of volumes for the write command based on the free space information for each volume, the drive type information for each volume, and the free space information for flash devices of the second storage system. For the free space information for the selected volume indicating free space exceeding a write size associated with the write command, the drive type information for the selected volume being flash, and the free space information for the flash devices indicating free space exceeding the write size associated with the write command, the method can further include updating the free space information for the flash drives based on the write size associated with the write command; and executing the write command on the flash devices of the second storage system.

Aspects of the present disclosure further include a computer program for a first storage system communicatively coupled to a second storage system configured to execute a second type of process and to manage a plurality of volumes, and a host configured to execute a first type of process. The computer program can include instructions for managing management information including free space information for each volume of the plurality of volumes of the second storage system, drive type information for each volume of the plurality of volumes of the second storage system, and free space information for flash devices of the second storage system; and, for receipt of a write command for data from the host, determining if the data is to be written to the first storage system or the second storage system. For the data determined to be written to the second storage system, the instructions can further include selecting a volume from the plurality of volumes for the write command based on the free space information for each volume, the drive type information for each volume, and the free space information for flash devices of the second storage system. For the free space information for the selected volume indicating free space exceeding a write size associated with the write command, the drive type information for the selected volume being flash, and the free space information for the flash devices indicating free space exceeding the write size associated with the write command, the instructions can further include updating the free space information for the flash drives based on the write size associated with the write command; and executing the write command on the flash devices of the second storage system. The instructions of the computer program may be stored on a non-transitory computer readable medium and configured to be executed by one or more processors.

Aspects of the present disclosure further include a computer program for a first storage system communicatively coupled to a second storage system configured to execute a second type of process and to manage a plurality of volumes, and a host configured to execute a first type of process. The computer program can include instructions for managing management information including free space information for each volume of the plurality of volumes of the second storage system, drive type information for each volume of the plurality of volumes of the second storage system, and free space information for flash devices of the second storage system; and, for receipt of a write command for data from the host, determining if the data is to be written to the first storage system or the second storage system. For the data determined to be written to the second storage system, the instructions can further include selecting a volume from the plurality of volumes for the write command based on the free space information for each volume, the drive type information for each volume, and the free space information for flash devices of the second storage system. For the free space information for the selected volume indicating free space exceeding a write size associated with the write command, the drive type information for the selected volume being flash, and the free space information for the flash devices indicating free space exceeding the write size associated with the write command, the instructions can further include updating the free space information for the flash drives based on the write size associated with the write command; and executing the write command on the flash devices of the second storage system. The instructions of the computer program may be stored on a non-transitory computer readable medium and configured to be executed by one or more processors.

Aspects of the present disclosure further include a system involving a first storage system communicatively coupled to a second storage system configured to execute a second type of process and to manage a plurality of volumes, and a host configured to execute a first type of process. The system can include means for managing management information including free space information for each volume of the plurality of volumes of the second storage system, drive type information for each volume of the plurality of volumes of the second storage system, and free space information for flash devices of the second storage system; and, for receipt of a write command for data from the host, means for determining if the data is to be written to the first storage system or the second storage system. For the data determined to be written to the second storage system, the system can further include means selecting a volume from the plurality of volumes for the write command based on the free space information for each volume, the drive type information for each volume, and the free space information for flash devices of the second storage system. For the free space information for the selected volume indicating free space exceeding a write size associated with the write command, the drive type information for the selected volume being flash, and the free space information for the flash devices indicating free space exceeding the write size associated with the write command, the system can further include means for updating the free space information for the flash drives based on the write size associated with the write command; and means for executing the write command on the flash devices of the second storage system.

BRIEF DESCRIPTION OF DRAWINGS

FIG. 6 illustrates a logical layout of a node management table, in accordance with an example implementation.

FIG. 7 illustrates a logical layout of a volume management table, in accordance with an example implementation.

FIG. 8 illustrates a logical layout of the OLTP Bit Map, in accordance with an example implementation.

DETAILED DESCRIPTION

Figure 1A:
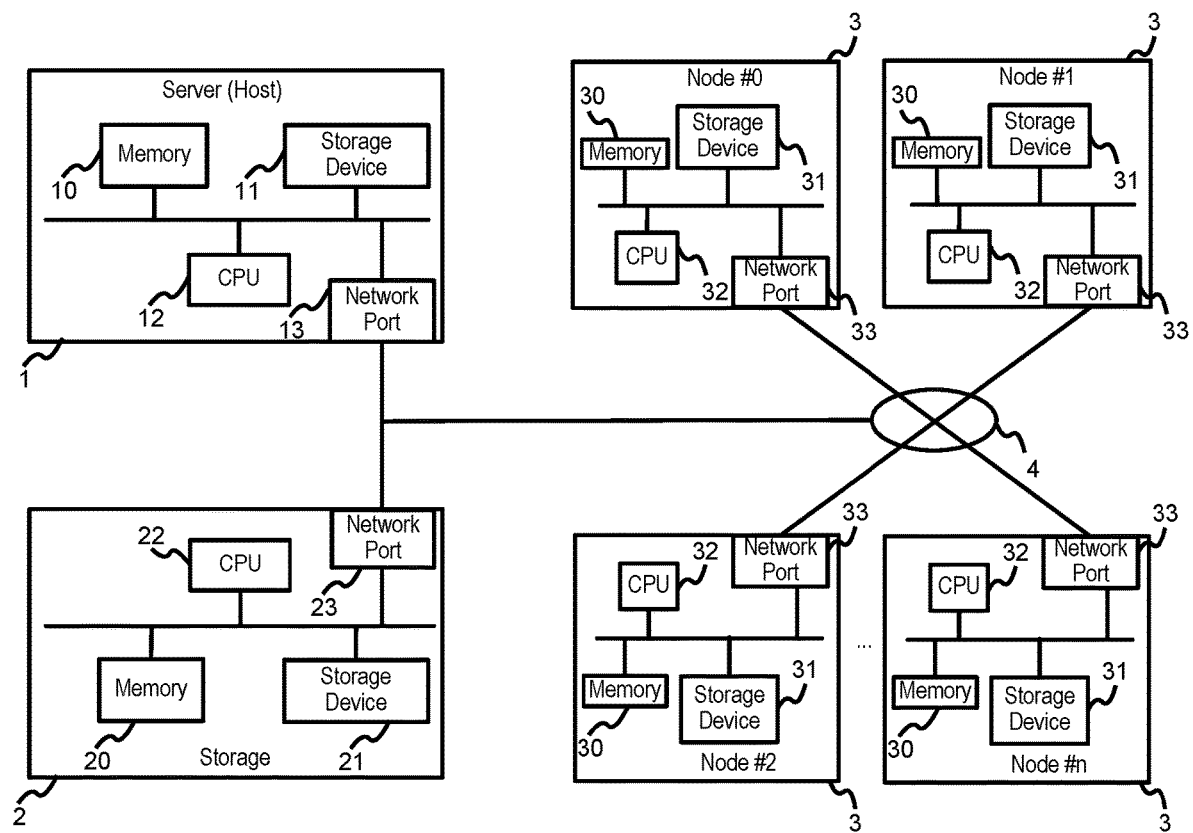
FIGS. 1A to 1C illustrate example physical configurations for a system upon which example implementations may be applied.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In an example implementation, there is a storage system configured to store replication data to the SDS, and systems and methods wherein the SDS switches processes when a failure occurs on a critical system.

FIG. 1A illustrates a physical configuration for a system upon which example implementations may be applied. In the example of FIG. 1A, host computers 1, storage system 2 and one or more SDS nodes 3 are connected to each other via network 4. Each host computer 1 can include memory 10, storage devices 11, central processing unit (CPU) 12, and network port 13. Storage system 2 can include memory 20, storage devices 21, CPU 22, and network port 23. Each node 3 can include memory 30, storage devices 31, CPU 32 and network port 33. Depending on the desired implementation, storage system 2 can be implemented as SDS or as AFA.

Memory 10, 20 and 30 can take the form of any memory depending on the desired implementation, such as dynamic random access memory (DRAM). Network 4 can be implemented as any type of network in accordance with a desired implementation, such as an internet protocol (IP) Network or a Storage Area Network (SAN).

Storage Devices 21 from the storage system 2 can involve flash devices, and storage devices 31 on SDS Nodes 3 can involve either flash devices or disks such as hard disk drives (HDD). The latency for access to flash devices is shorter than the latency for access to disk.

In an example of an input/output (I/O) process for FIG. 1A, storage system 2 receives I/O commands from Host Computer 1. Commands contain the logical unit number (LUN) of the primary volume on storage system 2 and the secondary volume on SDS nodes 3 or storage system 2. Data is written to the primary volume and copied to the secondary volume through conducting a replication process by CPU 22 on storage system 2. The LUN can be related to the volume number or the volume group number. If the LUN is related to the volume group, the volume selector 203 selects one volume from the volume group.

As illustrated in FIG. 1A, storage system 2 is communicatively coupled to other storage systems such as the SDS nodes 3 via network 4. SDS nodes 3 may be configured to execute a second type of process and to manage a plurality of volumes. Host computer 1 may be configured to execute a first type of process. Storage system 2 may include a memory 10 configured to manage management information which includes free space information for each volume of the plurality of volumes of the SDS nodes 3, as described by field 2025 by volume management table 202. Memory 10 may also be configured to store drive type information for each volume of the plurality of volumes of the SDS nodes 3 as described by field 2021 by volume management table 202. Memory 10 may also be configured to store free space information for flash devices of the SDS nodes 3 as described by field 2013 by node management table 201.

Figure 9:
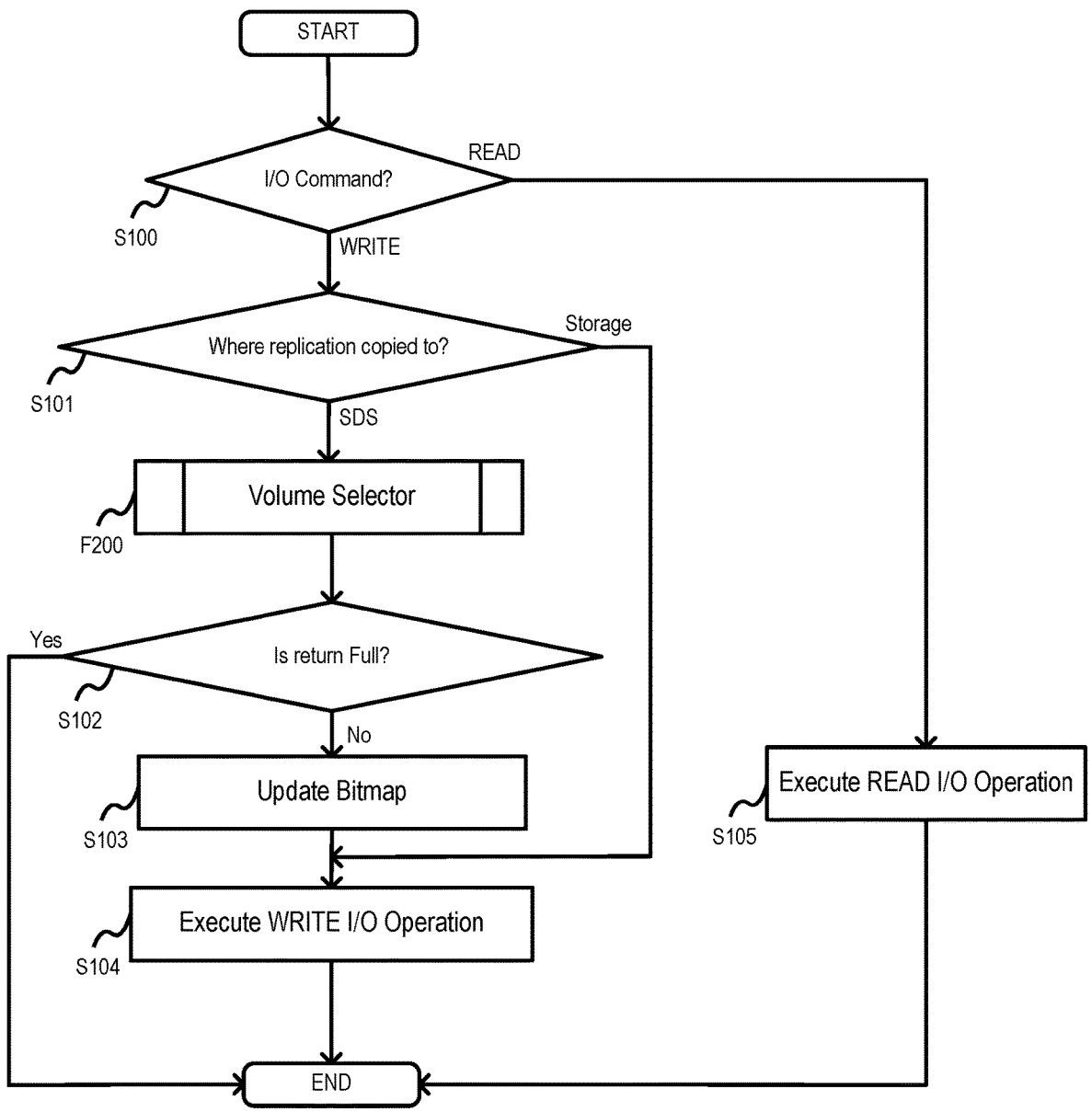
FIG. 9 illustrates an example flow for the I/O process, in accordance with an example implementation.
Figure 10:
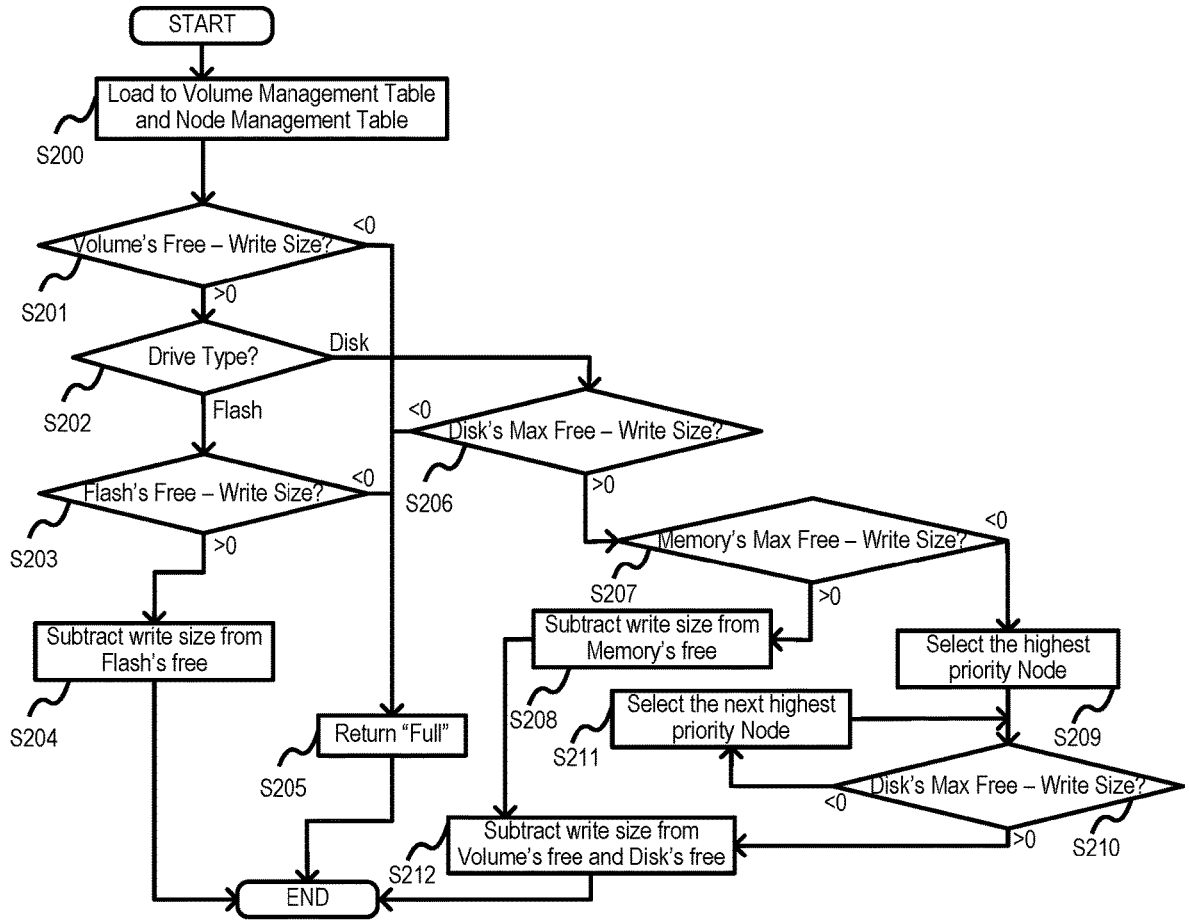
FIG. 10 illustrates a flow diagram for the volume selector, in accordance with an example implementation.

CPU 20 may be configured to, for receipt of a write command for data from the host, determine if the replication data is to be written to the storage system 2 or the other storage systems such as SDS nodes 3 as illustrated in FIG. 9. For the replication data determined to be written to the other storage systems such as SDS nodes 3, CPU 12 is configured to select a volume from the plurality of volumes for the write command based on the free space information for each volume, the drive type information for each volume, and the free space information for flash devices of the other storage system as illustrated in FIG. 9 and FIG. 10. In an example implementation, for the free space information for the selected volume indicating free space exceeding a write size associated with the write command, the drive type information for the selected volume being flash, and the free space information for the flash devices indicating free space exceeding the write size associated with the write command, the CPU 12 is configured to update the free space information for the flash drives based on the write size associated with the write command; and execute the write command on the flash devices of the other storage system such as the SDS node 3 as illustrated, for example, at S201 to S204 of FIG. 10.

Management information can also include free space information for hard disk drive devices of the other storage systems such as SDS nodes 3 and free space information for memory of the other storage systems such as SDS nodes 3 as shown, for example, at 2016 and 2018 of FIG. 6. CPU 12 can be configured to, for the free space information for the selected volume indicating free space exceeding the write size associated with the write command, the drive type information for the selected volume being hard disk drive, and the free space information for the hard disk drive devices indicating free space exceeding the write size associated with the write command, for the free space information for the memory of the other storage system indicating free space exceeding the write size associated with the write command, update the free space information for the hard disk drive devices and the free space information for the memory of the other storage system based on the write size associated with the write command, and execute the write command on the memory and the hard disk drive devices on the other storage system as illustrated, for example, at S207, S208 and S212 of FIG. 10. CPU 12 can be configured to, for the free space information for the selected volume indicating free space exceeding the write size associated with the write command, the drive type information for the selected volume being hard disk drive, and the free space information for the hard disk drive devices indicating free space exceeding the write size associated with the write command, for the free space information for the memory of the other storage system not exceeding the write size associated with the write command, select another storage system from the plurality of SDS nodes 3 based on priority, the priority determined based on CPU load; for the free space information for the hard disk drive devices of the selected storage system from the SDS nodes 3 indicating free space for disk drive devices exceeding the write size associated with the write command, execute the write command on the memory and the hard disk drive devices on the selected storage system; for the free space information for the hard disk drive devices of the selected storage system from the SDS nodes 3 indicating free space for disk drive devices not exceeding the write size associated with the write command, selecting another storage system from the SDS nodes 3 based on priority as described, for example, at S209 to S212 of FIG. 10.

Figure 11:
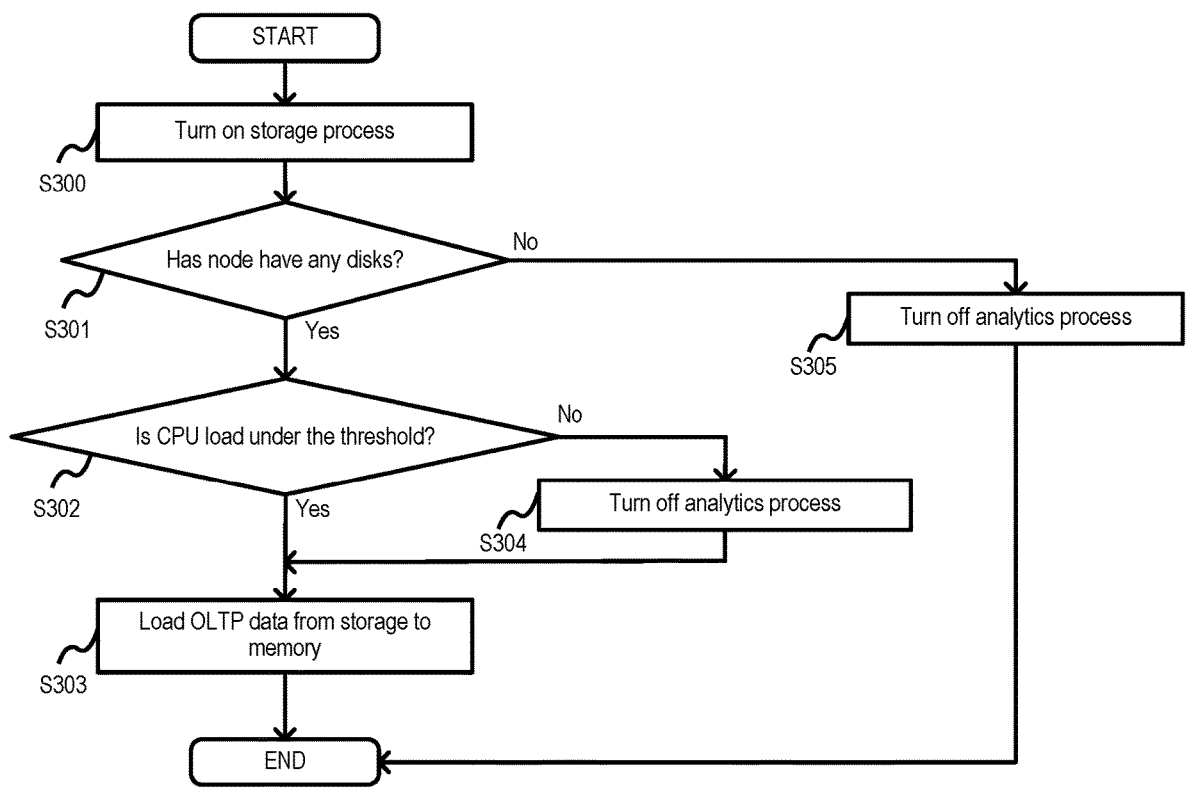
FIG. 11 illustrates a flow diagram for the process controller, in accordance with an example implementation.

Upon an occurrence of a failure of storage system 2, the other storage system from SDS nodes 3 is configured to execute the first type of process on the other storage system; and for the other storage system not having any hard disk drive devices, end the execution of the second type of process as illustrated at S300 and S305 of FIG. 11. Further, upon the occurrence of the failure of the storage system 2, the other storage system from SDS nodes 3 is configured to load data associated with the first type of process on the other storage system from the storage system 2; and for a load of a processor of the other storage system not being under a threshold, end the execution of the second type of process as illustrated in S304 of FIG. 11.

In example implementations, the first type of process is OLTP requiring lower latency than the second type of process, and wherein the second type of process is analytics processing. However, other processes can also be utilized, and the present disclosure is not limited thereto. OLTP can be replaced by any other process that requires lower latency than the process executed by the SDS nodes 3. The second type of process can include any process that does not require the low latency level of the first type of process.

Figure 1B:
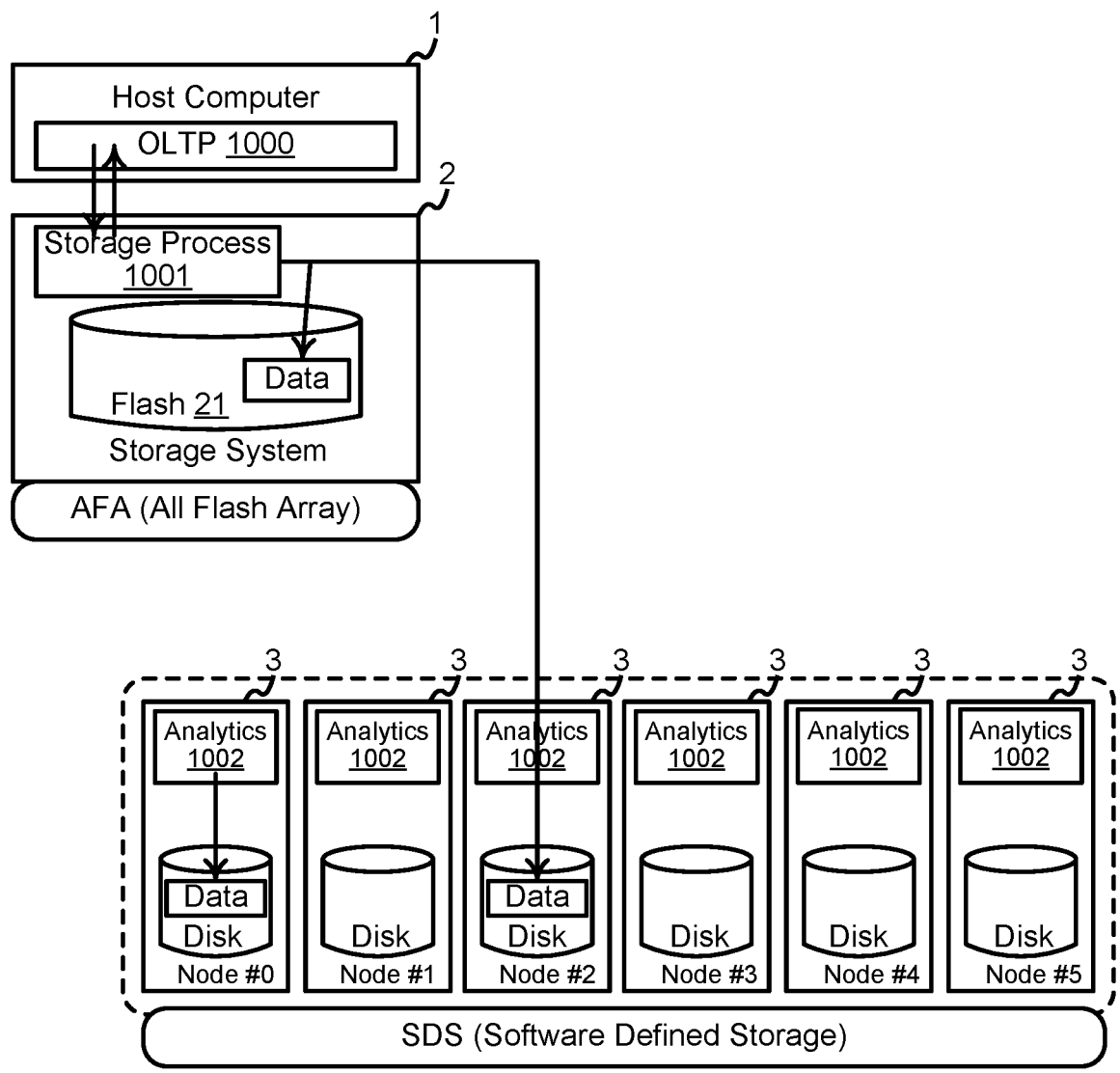
Figure 1C:
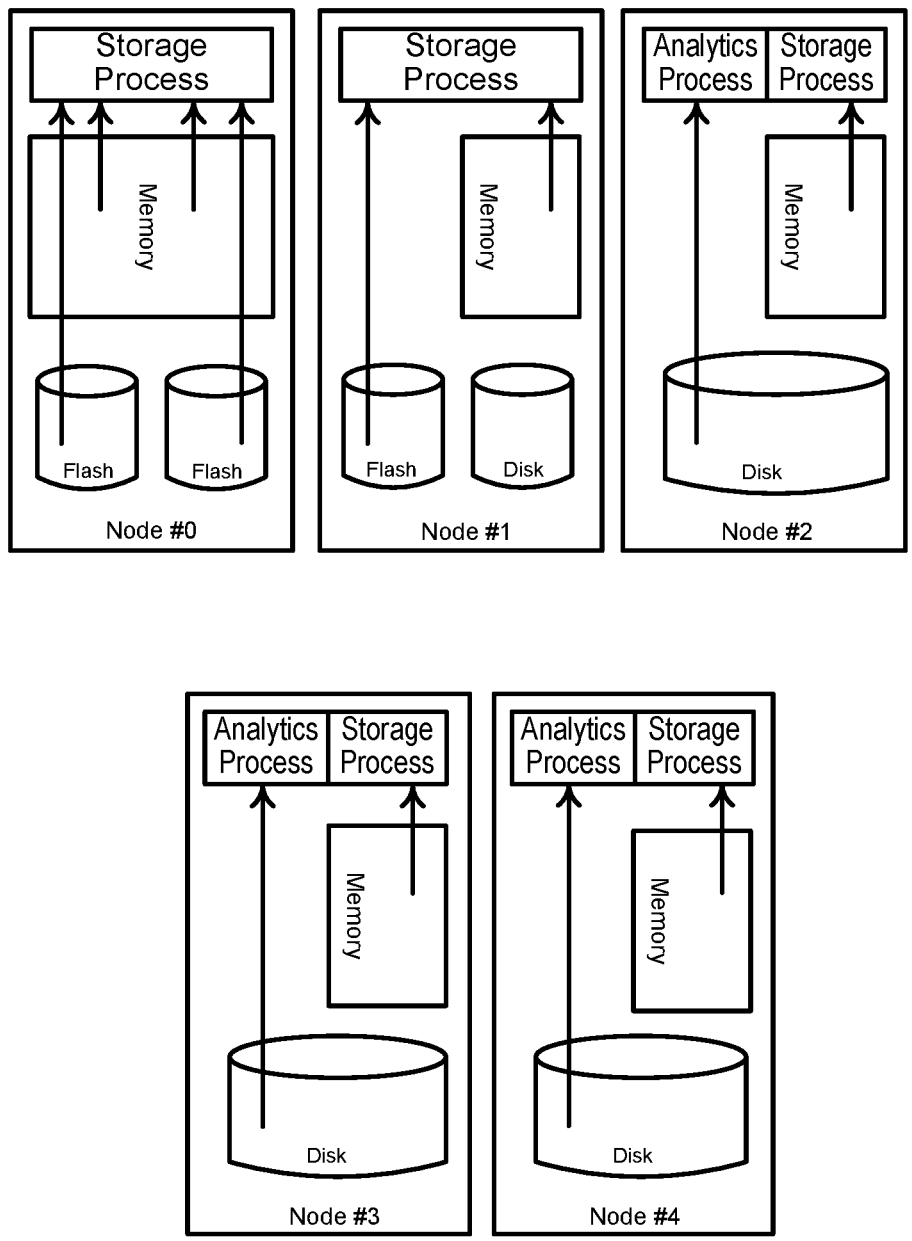

FIGS. 1B and 1C illustrate an example execution of processes of a physical configuration, in accordance with an example implementation. As illustrated in FIG. 1B, storage system 2 can be in the form of an AFA that conducts a storage process 1001 for OLTP 1000. The SDS nodes 3 can be used to execute data analytics 1002, which is a secondary process that may not require the low latency. In the example architecture of FIG. 1B, the requirements for the storage system 2 can include having a latency for OLTP 1000 that is shorter than analytics process 1002, minimized downtime, and minimization of performance degradation during a failure of the storage system 2. In example implementations, SDS nodes 3 are utilized as a backup system in case of failover, wherein the storage system 2 is configured to make data replication to SDS nodes 3, and when a failure occurs in storage system 2, the storage process 1001 can be executed on the SDS to continue the OLTP 1000. As storage system 2 involves flash devices (e.g. fast and more expensive than disk) and SDS nodes 3 involve disks (slower and cheaper than flash), storage response time may be delayed when the storage process 1001 is switched to SDS nodes 3 from storage system 2.

Example implementations are directed to addressing the delay in such switchover through the allocation of data to flash or to cache memory to reduce access to the disks. Thus after a failure occurs on the storage system 2, the storage process 1001 can be executed with higher priority than analytics process 1002, and analytics process 1002 can be shut off if the CPU load is high or maintained if the CPU load is lower than a threshold.

In example implementations, data is written to the primary volume on storage system 2, and replicated to a secondary volume on one of the SDS nodes 3. The secondary volume can either be flash or HDD, and then assigned a priority. Priority can be dynamically changed according to a desired CPU load function to allocate data to a SDS node 3 having a low load.

FIG. 1C illustrates an example implementation of SDS nodes in accordance with an example implementation. Storage processes 1001 can be run on nodes which have flash storage to shorten the latency for OTLP. Analytics processes 1002 can be run on nodes that only have disks. Further, analytics process 1002 can be stopped if the CPU load is over a threshold.

Figure 2:
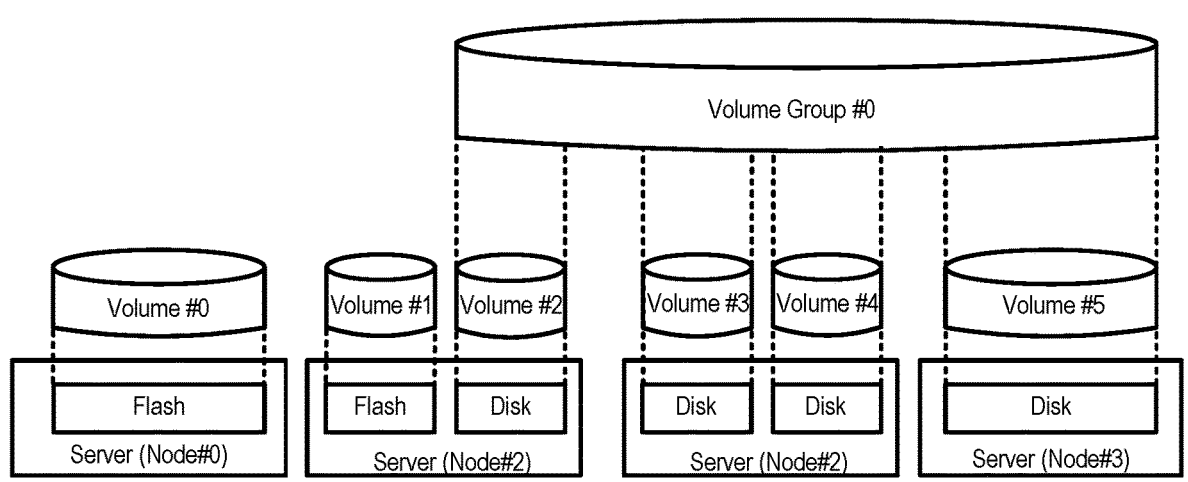
FIG. 2 illustrates an example relationship between volumes, pools, and storage devices for a SDS, in accordance with an example implementation.

FIG. 2 illustrates an example relationship between volumes, pools, and storage devices for a SDS, in accordance with an example implementation. In example implementations, volumes are created as a logical device on storage devices, and a volume group can contain multiple volumes. For example, if the host computer 1 specifies Volume #0 or Volume #1 via LUN, the data is written to Volume #0, or Volume #1. If the host computer 1 specifies the Volume Group #0 via LUN, a volume is selected from among the corresponding volumes within the Volume Group #0 (e.g. Volume #2, 3, 4 and 5) by Volume Selector 203, and then data is written to the volume selected.

Figure 3:
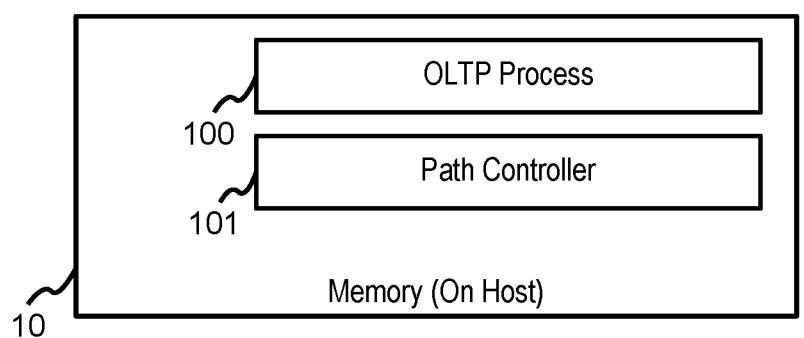
FIG. 3 illustrates a logical layout for the memory of the host computer, in accordance with an example implementation.

FIG. 3 illustrates a logical layout for the memory of the host computer, in accordance with an example implementation. In the example of FIG. 3, OLTP Process 100 executes OLTP which includes a process to write to storage system 2. Path Controller 101 executes path switching when a failure occurs for storage system 2. Host computer 1 sends I/O commands to the storage system 2 via network 4 during normal operating conditions, however, should a failure occur on the storage system 2, the Path Controller 101 switches the path and sends the I/O command to a SDS via SAN 4.

Figure 4:
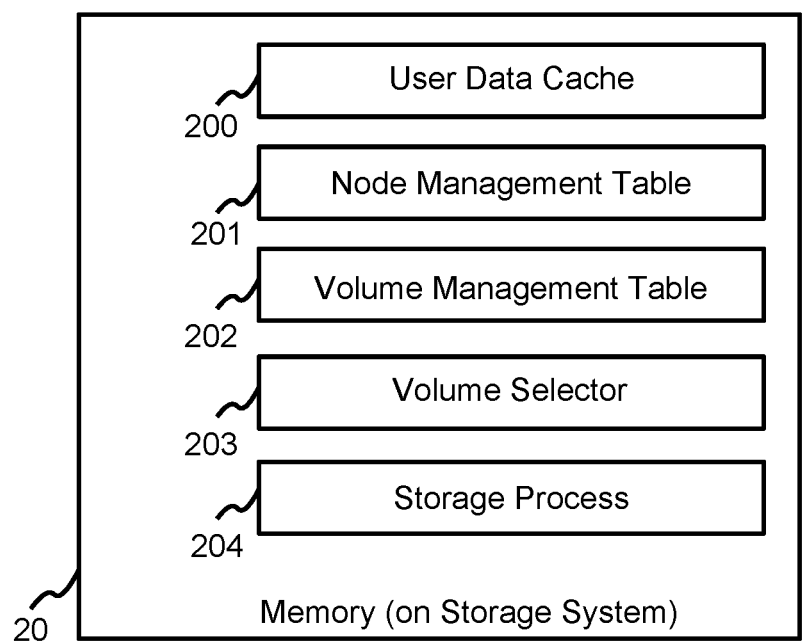
FIG. 4 illustrates a logical layout for the memory of the storage system, in accordance with an example implementation.

FIG. 4 illustrates a logical layout for the memory of the storage system, in accordance with an example implementation. In the example of FIG. 4, the user data cache 200 is configured as the intermediate area. When the storage device 21 receives a READ command from the host computer 1, the CPU 22 transfers data to the host computer 1 by reading from the storage device 21 and stores data to the user data cache 200. Such processing can improve the read latency as the CPU can read the user data from the user data cache 200 in the next cycle. CPU 22 writes user data to user data cache 200 not to storage device 21. The write latency may also become faster because CPU 22 can return the response to the host computer 1 before user data is written to storage device 21. The latency resulting from accessing the memory 20 is faster than the latency resulting from accessing the storage device 21.

Node Management Table 201 contains management information for the nodes 3 of the system. Further details of the node management table 201 are provided with respect to FIG. 6. Volume Management Table 202 contains management information for the volumes of the system. Further details of the volume management table 202 are provided with respect to FIG. 7. Volume Selector 203 provides a flow for selecting the volume for storing data from the OLTP process. Further details of the volume selector 203 are provided with respect to FIG. 10. Storage Process 204 executes I/O processes such as a READ process or a WRITE process.

Figure 5:
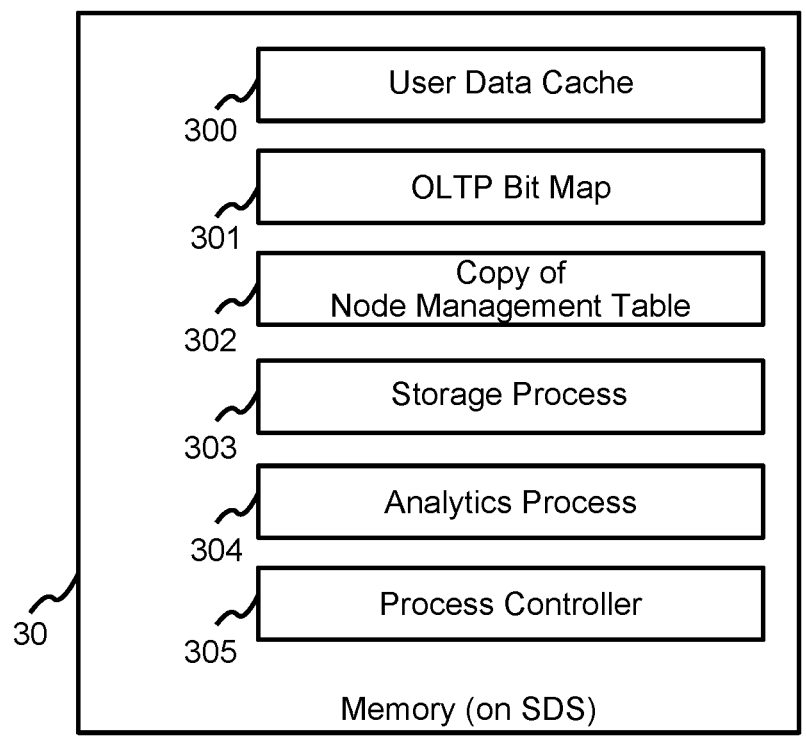
FIG. 5 illustrates an example logical layout for memory on an SDS node, in accordance with an example implementation.

FIG. 5 illustrates an example logical layout for memory 30 on an SDS node 3, in accordance with an example implementation. User Data Cache 300 conducts similar operations as the user data cache 200 on storage system 2. A copy of Node Management Table 302 contains the same information as Node Management Table 201. This node management table 302 is updated by the CPU 22 on storage system 2 as the same time that node management table 201 is updated.

The OLTP bit map 301 is a management table containing management information for OLTP processes. Further details about the OLTP bit map 301 is provided with respect to FIG. 8. Storage Process 303 is operationally similar to storage process 204 on storage system 2. Storage process 303 is invoked upon an occurrence of a failure in the storage system 2. Analytics Process 304 executes analysis by loading data from storage devices 31. Process Controller 305 executes switching processes according to the type of drives utilized by the nodes 3. Further details of the process controller 305 is described with respect to FIG. 9

FIG. 6 illustrates a logical layout of a node management table, in accordance with an example implementation. Node management table 201 is used for managing nodes and their relative management information. Such management information can include the node identifier (ID) or number 2010, number of flash drives 2011, total size of flash drives 2012, free space available for flash drives 2013, number of HDDs 2014, total size of HDDs 2015, free space available for HDDs 2016, total memory size 2017, free space available for memory 2018, node priority level 2019, and CPU load 201A. When Volume Selector 203 selects volume to write data, this table is used to refer to the pertinent node information (e.g. total size, free size of flash drives, HDDs and memory). After a volume is selected by volume selector 203, the node management table 201 updates the available free size by subtracting the size of the write to the corresponding drive.

With respect to the node priority level 2019, this field is referred to when Volume Selector 203 select the highest priority nodes. Node priority level 2019 is set based on any desired function in accordance with CPU load field 201A for each node 3. In the example of FIG. 6, the value 0 indicates the highest priority node for selection, however the present disclosure is not limited to such an implementation, and the value for the priority can be set according to the desired function.

FIG. 7 illustrates a logical layout of a volume management table, in accordance with an example implementation. Specifically, volume management table 202 is used for managing volumes and their relative management information. Such management information can include the volume ID or number 2020, the drive type 2021, the volume group ID or number 2022, the node ID or number 2023, the total size of the volume 2024, and the free space available for the volume 2025. When volume selector 203 selects the volume for the I/O operation, volume management table 202 provides information such as the drive type, Volume Group #, Node #and total and free size of volume to assist in the selection process.

FIG. 8 illustrates a logical layout of the OLTP Bit Map, in accordance with an example implementation. The OLTP bit map 203 is a management table that provides management information regarding which page has OLPT data. Such management information can include the pages 2030, and the bit map corresponding to the pages 2031. A page is unit (e.g. 64 KB) to manage data on volumes. Each bit corresponds to each page. In the example indicated in FIG. 8, 1 indicates that the page has OLTP data, and 0 indicates that the page does not involve OLTP data. Should a failure occur on the OLTP system, the process controller 305 utilizes the OLTP bit map 203 to load OLTP data from storage to memory.

FIG. 9 illustrates an example flow for the I/O process, in accordance with an example implementation. The flow of FIG. 9 is executed by CPU 22 when storage system 2 receives a command from the host computer 1. The received command contains a LUN which is used to indicate the address of a particular volume inside storage system 2. The received command also contains an operation code such as READ/WRITE, the data size of the operation and/or information as to whether replication is enabled/disabled. If the replication is enabled, the received command contains LUNs which are used to indicate the addresses of primary and secondary volumes inside storage system 2 and SDS nodes 3.

At S100, CPU 22 determines whether the I/O command is a READ or WRITE command. If the I/O command is a READ command, then the flow proceeds to S105 to execute the READ I/O process. If the I/O command is a WRITE command, then the flow proceeds to S101 to execute the WRITE command.

At S101, CPU 22 then determines if the replication data is to be copied to the SDS node 3. If the replication data is to be written to storage system 2 (storage), then the flow proceeds to S104 to execute the WRITE I/O operation and copy the replication data to storage system 2. If the replication data is to be copied to the SDS node 3 (SDS), then the flow proceeds to execute volume selector function F200.

At S102, CPU 22 determines if the return code from the volume selector function F200 indicates that the volumes are full or not. If the volumes are full (Yes), then the flow ends. Otherwise (No), the flow proceeds to S103, wherein CPU 22 requests the CPU 32 of the SDS node 3 to update OLTP Bitmap 203. The flow then proceeds to S104 to execute the WRITE I/O process onto the selected volume.

FIG. 10 illustrates a flow diagram for the volume selector, in accordance with an example implementation. This flow is executed on CPU 22 when the I/O Process calls this function at F200. At S200, the volume selector refers to management information for the volumes and nodes by loading volume management table 202 and node management table 201. At S201, the volume selector determines the volume ID based on the LUN of secondary volume included in the received I/O command. The volume selector determines whether the free size of the determined volume from SDS node 3 is larger than the write size or not by referring to the free space in the volume field 2025 in volume management table 202. Write size is the size of the data to be transferred from storage system 2 to SDS node 3. If the free size of the volume is larger than the write size (>0), the flow proceeds to S202, otherwise (<0), the flow proceeds to S205 to provide a return code of "Full" for the I/O process. At S202, the volume selector determines the drive type by referring to field 2021 on Node Management Table 201. If the volume type is determined to be flash, then the flow proceeds to S203, otherwise if it is disk then the flow proceeds to S206.

At S203, the volume selector determines whether the size of the free space of the flash, in the SDS node 3 providing the volume, is larger than the write size or not by referring to the free flash size field 2013 on node management table 201. If the free size of the flash is larger than the write size (>0), then the flow proceeds to S206, otherwise (<0) the flow proceeds to S205 to provide a return code of "Full" for the I/O process. At S204, the volume selector subtracts the write size from the size of the free space for the free flash size field 2013 on node management table 201.

At S206, the volume selector determines whether the maximum free size of the disk, in the one or more SDS nodes 3 providing the volume, is larger than the write size or not by referring to the free space available for disk field 2016 on node management table 201. If the maximum free space is less than the write size (<0), then the flow proceeds to S205 to provide a return code of "Full". Otherwise, if the maximum free space is larger than the write size (>0), then the flow proceeds to S207. If the volume group number is specified, the volume selector refers to the node ID or number field 2023 within the volume group. Volume selector refers to the free space on the disk field 2016 by comparing node ID or number field 2010 and node ID or number field 2023. Volume selector refers to the maximum size, because if the maximum size is smaller than write size, then no disk has the capacity to store the write data. In such a situation, the volume selector provides the return code of "Full" to I/O Process. The return code is utilized for confirming whether there are any nodes that contain sufficient free space for the write operation.

For example, if the free space of the disk for each node is 64 MB, and the maximum free size is 64 MB, any write data larger than 64 MB cannot be written to the volume. If the free size of a node is 256 MB and the free space of the other nodes are 64 MB, then the maximum free size is 256 MB. Thus, write data of 256 MB or less can be written to the volume.

At S207, the volume selector determines if the maximum free space of the memory, in the one or more SDS nodes 3 providing the volume, is larger than the write size or not by referring to the free space available for memory field 2018 on node management table 201. If the free space of the memory is larger than the write size (>0), then the flow proceeds to S208. Otherwise, if the free space of the memory is less than the write size (<0), then the flow proceeds to S209.

At S208, the volume selector subtracts the write size from the free space of the memory field 2018, and updates the free space of the memory field 2018 on node management table 201.

At S209, the volume selector selects the highest priority node, within the one or more SDS nodes 3 providing the volume, by referring to Field 2019 on Node Management Table 201. At S210, the volume selector determines if the free size of the disk of the selected node is larger than the write size or not by referring to the free space of the disk field 2016 on the node management table 201. If the free size of the disk is larger than the write size (>0) then the flow proceeds to S212. Otherwise, if the free size of the disk is less than the write size (<0), then the flow proceeds to S211.

At S211, if the node selected from the flow at S210 does not have sufficient space to store the write data, then the flow proceeds to the next highest priority node, and re-queues the present node back in the queue. Should all of the nodes be traversed, then the volume selector selects the first available node in the queue.

At S212, the volume selector subtracts the write size from free space of the disk and updates the Disk's free and update the total size of the disk field 2015 on node management table 201.

FIG. 11 illustrates a flow diagram for the process controller 305, in accordance with an example implementation. Specifically, the flow of FIG. 11 is executed by CPU 32 on SDS nodes 3 when a failure occurs on storage system 2.

At S300, the storage process 204 for OLTP process is activated. At S301, the process controller determines if a SDS node 3 has disks or not by referring to the number of disks field 2014 on the copy of node management table 302. If the node does have disks (Yes) then the flow proceeds to S302, otherwise (No), the flow proceeds to S305 to turn off any secondary processes or analytics processes and utilizes the CPU 32 to execute the storage process for OLTP.

At S302, the process controller determines if the load of the CPU 32 is over a threshold or not by referring to CPU load field 201A on the copy of node management table 302. If the load of the CPU 32 is under the threshold (Yes), then the flow proceeds to S303, otherwise (No), the flow proceeds to S304. At S303, the process controller loads the OLTP data from the storage device 31 (disk) to the memory 30 of the SDS node 3 by referring to OLTP Bit Map 203.

At S304, if the CPU load is over the threshold, then operations other than the storage process for OLTP is turned off to provide as much CPU to the storage process for OLTP as possible.

Figure 12:
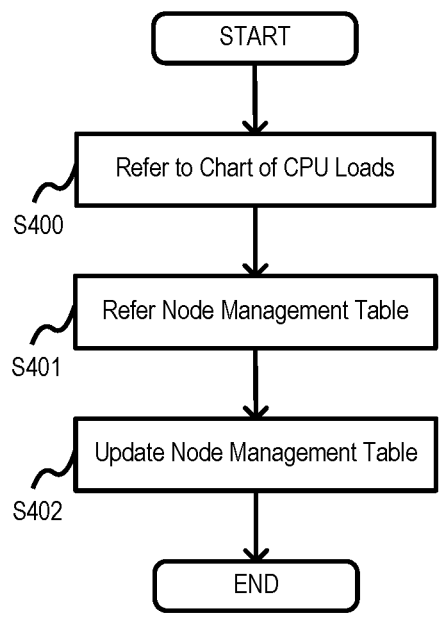
FIG. 12 illustrates a flow for priority determination, in accordance with an example implementation.

FIG. 12 illustrates a flow for priority determination, in accordance with an example implementation. The flow is executed by CPU 32 on SDS nodes 3 regularly, for example once per minute. The priority is determined based on the disk type of the nodes and the CPU load. If the node does not have disks, then the priority of the node is set to the lowest priority. If the node has disks, then the priority of the node is set depending on the CPU loads. For example, nodes with higher CPU load has lower priority.

At S400, the flow begins by referring to the CPU load field 201A on the node management table 302. At S401, the flow proceeds to refer to node management table 201. At S402, the node management table 201 is updated by recalculating the priority for each node in the priority field 2019.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A system comprising a first storage system communicatively coupled to one or more second storage systems configured to execute a second type of process and to manage a plurality of volumes, and a host configured to execute a first type of process, the first storage system comprising:
    a memory configured to manage management information comprising free space information for each volume of the plurality of volumes of the one or more second storage systems, drive type information for each volume of the plurality of volumes of the one or more second storage systems, and free space information for flash devices of the one or more second storage systems;
    and a processor configured to:
        for receipt of a write command for data associated with the first type of process from the host, determine replication of the data is to be conducted to the one or more second storage systems;
        for replication of the data determined to be conducted to the one or more second storage systems:
            select a volume from the plurality of volumes for the write command based on the free space information for each volume, the drive type information for each volume, and the free space information for flash devices of the one or more second storage systems;
            for the free space information for the selected volume indicating free space exceeding a write size associated with the write command, the drive type information for the selected volume being flash, and the free space information for the flash devices indicating free space exceeding the write size associated with the write command: update the free space information for the flash devices based on the write size associated with the write command; and write the replication of the data on the flash devices of the one or more second storage systems.

2. The system of claim 1, wherein the management information further comprises free space information for hard disk drive devices of the one or more second storage systems and free space information for memory of the one or more second storage systems;
    wherein the processor is further configured to, for the free space information for the selected volume indicating free space exceeding the write size associated with the write command, the drive type information for the selected volume being hard disk drive, and the free space information for the hard disk drive devices indicating free space exceeding the write size associated with the write command:
        for the free space information for the memory of the one or more second storage systems indicating free space exceeding the write size associated with the write command, update the free space information for the hard disk drive devices and the free space information for the memory of the one or more second storage system based on the write size associated with the write command, and
        write the replication of the data on the hard disk drive devices on the one or more second storage systems.

3. The system of claim 2,
    wherein the processor is further configured to, for the free space information for the selected volume indicating free space exceeding the write size associated with the write command, the drive type information for the selected volume being hard disk drive, and the free space information for the hard disk drive devices indicating free space exceeding the write size associated with the write command:
        for the free space information for the memory of the one or more second storage systems not exceeding the write size associated with the write command, select one second storage system from the one or more second storage systems based on priority, the priority determined based on a central processing unit (CPU) load;
        for the free space information for the hard disk drive devices of the selected one second storage system from the one or more second storage systems indicating free space for disk drive devices exceeding the write size associated with the write command, write the replication of the data on the hard disk drive devices on the selected one second storage system;
        for the free space information for the hard disk drive devices of the selected one second storage system from the one or more second storage systems indicating free space for disk drive devices not exceeding the write size associated with the write command, selecting another second storage system from the one or more second storage systems based on priority.

4. The system of claim 1, wherein upon an occurrence of a failure of the first storage system while the one or more second storage systems is executing the second type of process, the one or more second storage systems are configured to:
  execute a storage process for the first type of process on the one or more second storage systems;
  for the one or more second storage systems not having any hard disk drive devices, end the execution of the second type of process.

5. The system of claim 4, wherein upon the occurrence of the failure of the first storage system while the one or more second storage systems is executing the second type of process and the one or more second storage systems comprises the hard disk drive devices, the one or more second storage systems is configured to:
  load data associated with the first type of process from the hard disk drive devices to a memory in the one or more second storage systems; and
  for a load of a processor of the one or more second storage systems not being under a threshold, end the execution of the second type of process.

6. The system of claim 1, wherein the first type of process is an Online Transaction Processing (OLTP) requiring lower latency than the second type of process, and wherein the second type of process is analytics processing.

7. A non-transitory computer readable medium, storing instructions for a first storage system communicatively coupled to one or more second storage systems configured to execute a second type of process and to manage a plurality of volumes, and a host configured to execute a first type of process, the instructions for the first storage system comprising:
  managing management information comprising free space information for each volume of the plurality of volumes of the one or more second storage systems, drive type information for each volume of the plurality of volumes of the one or more second storage systems, and free space information for flash devices of the one or more second storage systems;
  for receipt of a write command for data associated with the first type of process from the host, determining replication of the data is to be conducted to the one or more second storage systems;
  for replication of the data determined to be conducted to the one or more second storage systems:
    selecting a volume from the plurality of volumes for the write command based on the free space information for each volume, the drive type information for each volume, and the free space information for flash devices of the second storage system;
    for the free space information for the selected volume indicating free space exceeding a write size associated with the write command, the drive type information for the selected volume being flash, and the free space information for the flash devices indicating free space exceeding the write size associated with the write command:
      updating the free space information for the flash devices based on the write size associated with the write command; and
      writing the replication of the data on the flash devices of the one or more second storage systems.

8. The non-transitory computer readable medium of claim 7, wherein the management information further comprises free space information for hard disk drive devices of the one or more second storage systems and free space information for memory of the one or more second storage systems;
  wherein the instructions further comprise, for the free space information for the selected volume indicating free space exceeding the write size associated with the write command, the drive type information for the selected volume being hard disk drive, and the free space information for the hard disk drive devices indicating free space exceeding the write size associated with the write command:
    for the free space information for the memory of the one or more second storage systems indicating free space exceeding the write size associated with the write command, updating the free space information for the hard disk drive devices and the free space information for the memory of the one or more second storage system based on the write size associated with the write command, and
    writing the replication of the data on the hard disk drive devices on the one or more second storage systems.

9. The non-transitory computer readable medium of claim 8, wherein the instructions further comprises:
  for the free space information for the selected volume indicating free space exceeding the write size associated with the write command, the drive type information for the selected volume being hard disk drive, and the free space information for the hard disk drive devices indicating free space exceeding the write size associated with the write command:
    for the free space information for the memory of the one or more second storage systems not exceeding the write size associated with the write command, selecting one second storage system from the one or more second storage systems based on priority, the priority determined based on a central processing unit (CPU) load;
    for the free space information for the hard disk drive devices of the selected one second storage system from the one or more second storage systems indicating free space for disk drive devices exceeding the write size associated with the write command, writing the replication of the data on the hard disk drive devices on the selected one second storage system;
    for the free space information for the hard disk drive devices of the selected one second storage system from the one or more second storage systems indicating free space for disk drive devices not exceeding the write size associated with the write command, selecting another second storage system from the one or more second storage systems based on priority.

10. The non-transitory computer readable medium of claim 7, wherein upon an occurrence of a failure of the first storage system while the one or more second storage systems is executing the second type of process, the one or more second storage systems, are configured to:
  execute a storage process for the first type of process on the one or more second storage systems;
  for the one or more second storage systems not having any hard disk drive devices, end the execution of the second type of process.

11. The non-transitory computer readable medium of claim 10, wherein upon the occurrence of the failure of the first storage system while the one or more second storage systems is executing the second type of process and the one or more second storage systems comprises the hard disk drive devices, the one or more second storage systems is configured to:

load data associated with the first type of process from the hard disk drive devices to a memory in the one or more second storage systems; and for a load of a processor of the one or more second storage systems not being under a threshold, end the execution of the second type of process.

12. The non-transitory computer readable medium of claim 7, wherein the first type of process is an Online Transaction Processing (OLTP) requiring lower latency than the second type of process, and wherein the second type of process is analytics processing.

13. A method for a first storage system communicatively coupled to one or more second storage systems configured to execute a second type of process and to manage a plurality of volumes, and a host configured to execute a first type of process, the method comprising:

managing management information comprising free space information for each volume of the plurality of volumes of the one or more second storage systems, drive type information for each volume of the plurality of volumes of the one or more second storage systems, and free space information for flash devices of the one or more second storage systems;

for receipt of a write command for data associated with the first type of process from the host, determining replication of the data is to be conducted to the one or more second storage systems;

for replication of the data determined to be conducted to the one or more second storage systems:

selecting a volume from the plurality of volumes for the write command based on the free space information for each volume, the drive type information for each volume, and the free space information for flash devices of the one or more second storage systems;

for the free space information for the selected volume indicating free space exceeding a write size associated with the write command, the drive type information for the selected volume being flash, and the free space information for the flash devices indicating free space exceeding the write size associated with the write command:

updating the free space information for the flash devices based on the write size associated with the write command; and writing the replication of the data on the flash devices of the one or more second storage systems.

14. The method of claim 13, wherein the management information further comprises free space information for hard disk drive devices of the one or more second storage systems and free space information for memory of the one or more second storage systems;

wherein the method further comprises, for the free space information for the selected volume indicating free space exceeding the write size associated with the write command, the drive type information for the selected volume being hard disk drive, and the free space information for the hard disk drive devices indicating free space exceeding the write size associated with the write command:

for the free space information for the memory of the one or more second storage systems indicating free space exceeding the write size associated with the write command, updating the free space information for the hard disk drive devices and the free space information for the memory of the one or more second storage system based on the write size associated with the write command, and writing the replication of the data on the hard disk drive devices on the one or more second storage systems.

15. The method of claim 14, further comprising:

for the free space information for the selected volume indicating free space exceeding the write size associated with the write command, the drive type information for the selected volume being hard disk drive, and the free space information for the hard disk drive devices indicating free space exceeding the write size associated with the write command:

for the free space information for the memory of the one or more second storage systems not exceeding the write size associated with the write command, selecting one second storage system from the one or more second storage systems based on priority, the priority determined based on a central processing unit (CPU) load;

for the free space information for the hard disk drive devices of the selected one second storage system from the one or more second storage systems indicating free space for disk drive devices exceeding the write size associated with the write command, writing the replication of the data on the hard disk drive devices on the selected one second storage system;

for the free space information for the hard disk drive devices of the selected one second storage system from the one or more second storage systems indicating free space for disk drive devices not exceeding the write size associated with the write command, selecting another second storage system from the one or more second storage systems based on priority.

\* \* \* \* \*